May 14, 1940.　　　H. J. MURRAY　　　2,200,890
POWER TRANSMISSION DEVICE
Filed April 8, 1938　　2 Sheets-Sheet 1 inventor
Howard J. Murray inventor.

Howard J. Murray

Patented May 14, 1940

2,200,890

UNITED STATES PATENT OFFICE 2,200,890

POWER TRANSMISSION DEVICE

Howard J. Murray, New York, N. Y.

Application April 8, 1938, Serial No. 200,821

11 Claims. (Cl. 172—239)

My invention relates in general to an automatic variable speed power transmission mechanism and specifically relates to a device for effecting and affecting speed drive relations between driving and driven members.

One of the objects of the present invention is to provide a form of mechanism arranged so as to employ a small portion of the power delivered by the driving member so as to both automatically and selectively control the speed drive relations of the driving and driven members of the transmission mechanism.

A still further object of the present invention is to effect the transmission of power from a driving member to a driven member under such conditions that the speed of the driven member may be selectively varied as it is additionally automatically varied according to the said selection.

An additional object of the present invention is to provide an alternating current electric power transmission control and current storage and supply mechanism without any moving contacts in the said mechanism.

A still additional object of the present invention is to provide means including in effect an inductor alternator type of dynamo-electric clutching means designed to tend to hold certain members of a gear organization including a plurality of differential driving sets so that the holding action of the clutching means may be in effect mechanically amplified so as to control a plurality of progressively increasing holding actions of the said secondary sets collectively causing the said transmission of power from the driving member to the driven member.

The present disclosure is a further development of the invention disclosed in my co-pending application, Serial Number 23,040 filed May 23, 1935, patented March 21, 1939, No. 2,150,983, entitled "Automatic electric variable speed bidirectional and free-wheeling transmission." In the device disclosed in application 23,040, the derived control current is short-circuited locally in the rotor element 20 of that application. According to the present disclosure the field producing means and the associated armature elements are stationary. The field flux is moved through the armature inductors by a rotating inductor element. The resulting alternating current induced in the armature winding is conducted to an external circuit including a current rectifier, a variable resistance and a variable impedance. Thus, the conducted current may be stored, varied in magnitude and also employed to create magnetic flux in the field producing element. The field current is further affected by co-incidentally actuated vehicle control elements employed in the normal operation of the mechanism upon which the device is installed and operated.

The present disclosure is a further development of the invention described in my co-pending U. S. application Serial No. 66,876 filed March 3, 1936.

Still further the present disclosure contemplates the use of a manually actuated field producing control so that the intensity of the armature flux cutting action and thus the action of the dynamo-electric clutch may be varied. The present disclosure also provides circuit means included in the closed circuit including the armature inductors wherein the magnitude of the induced alternating current from the armature may be automatically varied according to its frequency.

While the present invention is capable of use in any operation where it is desired to receive control power from a driving member at variable speed, the present invention is further particularly applicable to an electrically controlled variable speed power transmission mechanism designed for use in connection with automobile construction, and it is in this connection that the embodiment of the invention will be described in detail.

Figure 1:
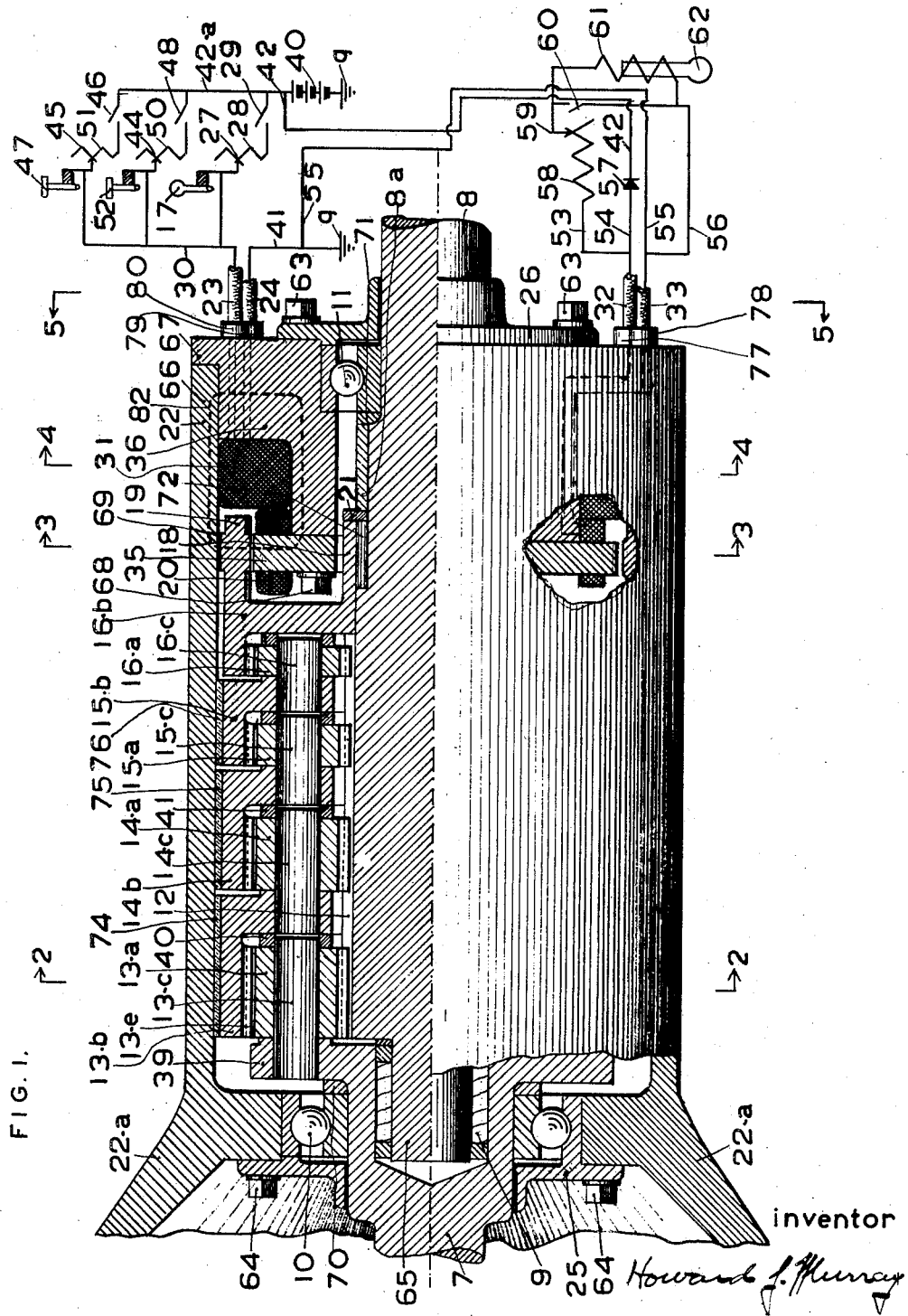
Figure 1 is one form of physical embodiment of my invention taken axially of the main shafts.

In the following description and in the claims, parts will be identified by specific names for convenience of expression, but they are intended to be as generic in their application to similar parts as the art will permit.

There is shown in the drawings a novel alternating current dynamo-electric generating, storage and control organization and associated mechanical power transmission elements constituting an automatic electrically controlled variable speed transmission mechanism and including a pair of power shafts 7 and 8 disposed in axial alignment with their adjacent ends interfitting so as to provide proper space for the bearing element 9.

The power shafts 7 and 8 are mounted for independent rotary movement respectively in suitable bearings 10 and 11 positioned and supported in the transmission casings 22 and 67 by the flanged elements 25 and 26. While either of these power shafts 7 and 8 may be considered as the driving or driven member of the transmission, for the purpose of this description, it will be understood that the shaft 7 is the normal driving shaft, and is operatively connected to be driven from a course of power such as an internal combustion engine or other suitable mover (not shown).

Accordingly, shaft 8 is regarded as the normally driven shaft, and is operatively connected to whatever mechanism (not shown) is designed to be driven from the mover.

The shaft 8 is preferably formed with a plurality of splines or teeth 12 formed so as to operatively receive a plurality of groups of toothed planet gears forming together with the splines 12 a plurality of secondary differential gear sets all mechanically connected in operative relation with the driving member 7 and the driven member 8 as hereinafter described.

The planet gears 13—A, 14—A, 15—A and 16—A are separately supported by the shafts 13—c, 14—c, 15—c and 16—c so as to be constantly in mesh with the sun splines or teeth 12, and the gears are positioned with the shafts 13—c to rotate with the normally driving member 7. Unless otherwise specified, the gears of all types as shown in Figure 1 are preferably made of a good quality of steel, and the casings 22 and 67 are made of material such as is suitable for magnetic circuits. The gears 13—b, 14—b, 15—b and 16—b are annular gears positioned and supported by the bearings 74, 75 and 76 and having portions to receive the shafts 13—c, 14—c, 15—c and 16—c and are positioned on the said shafts so as to mesh with the annular gears in turn meshing with the sun splines 12.

With this arrangement it is evident that the planet gear 13—a is constantly in mesh with the teeth of the normally driven member 8 and the internal gear 13—b. Gear 14—a is constantly in mesh with sun teeth 12 and the internal gear 14—b. Gear 15—a is constantly in mesh with the sun teeth 12 and the internal gear 15—b, and gear 16—a is constantly in mesh with the sun teeth 12 and the annular gear 16—b.

In passing, it should be noted that the sun teeth 12 forming portions of the driven gear shaft 8 are in reality to be considered as gear teeth for the purpose of this description, and that the portions of the common teeth 12 meshing with the gears 13—a, 14—a, 15—a and 16—a are portions of the secondary differential sets.

In this event, it is obvious that power may be transmitted by and between the members 7 and 8 by a plurality of transmission paths, and that each of these power paths will transmit power in some proportion to the extent of retardation of the rotation of the annular gears 13—b, 14—b, 15—b and 16—b. It is also evident that any retardation of the clock-wise rotation of the annular gear 16—b will be transmitted to the other annular gears 15—b, 14—b and 13—b.

Inspection will show that there are many paths provided for the transmission of power from one of the members 7 and 8 to the other. For example, path one is common to path two for a portion of its length. In the same manner, path two is common to path three for a portion of its length, and so on. All the paths are co-operatively associated, and any change in the status of one path will be transmitted to the other paths. The speed relations of all the gears of Figure 1 are fixed because they are all constantly in mesh.

In the same manner, the speed of the inductor portion 19 of the annular gear 16—b is always a function of the speed relations of all the other annular gears, and conversely the speed relations of the said gears are determined by the speed of the said inductor portion 19. Any change in the relative speed of the inductor portion 19 will necessarily cause a change in the speed driving relation of the members 7 and 8. If the inductor portion 19 is in effect retarded by electrical or mechanical means, it is obvious that the differential relations of the gears of Figure 1 will necessarily be changed.

Figure 3:
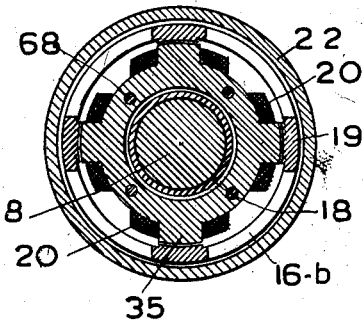
Figure 3 is a transverse sectional elevation taken approximately upon the line 3—3 of Figure 1 looking in the direction indicated by the arrows.

This inductor portion 19 is preferably formed integral with the annular gears 16—b as shown by Figures 1 and 3, although it is obvious that it would be within the spirit of this invention to provide the inductor portion 19 in any known and accepted manner.

Normally the inductor portion 19 is positioned so as to rotate between the magnetic pole pieces formed from portions of the casing 22 and the element 35 (see Figures 1 and 3). These portions together with the portion 67 form portions of a magnetic path energized by current initially supplied from the source 40 to the field producing winding 31.

Any power transmitted from the gear planet 16—a to the gear 16—b will cause the gear 16—b to normally react according to the differential relation of these gears of Figure 1 to tend to rotate the inductor portion 19 and thus the gear 16—b will be rotated on the member 8 by means of its flanged bearing portion 18. The gear 16—b is axially positioned on the shaft 8 by means of the lock-ring member 21.

Figure 5:
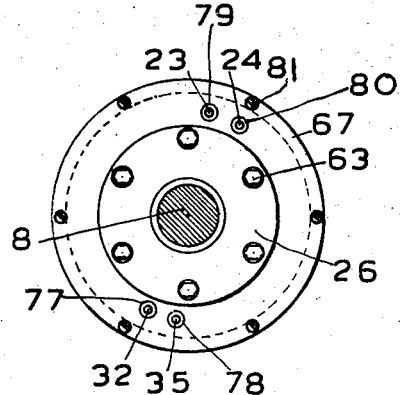
Figure 5 is an end view in elevation taken from the line 5—5 of Figure 1, looking in the direction indicated by the arrows.

The flux path end portion 36 also is formed to act as the end piece support of the transmission mechanism. The armature pole-piece portion 35 is securely attached to the flux path member 36 by means of the bolts 68, after the field winding 31 has been placed in position. The portion 36 is then moved axially within the transmission casing 22 to the position shown in Figure 1 and then can be attached to the casing 22 by means of the screws 81 (see Figure 5.) The field winding supply leads 23 and 24 are brought out from the winding 31 through proper openings in the member 36 and protected by the insulating bushings 79 and 80. In the same manner the armature winding current leads 32 and 33 are brought out and protected by the insulating bushings 77 and 78. After the spacer 8—a is in position on the shaft 8, the bearing 11 is installed as shown and the retainer member 26 is attached to the end portion 36 by means of the bolts 63.

In operation, let it be assumed that the source of vehicle power (not shown) is connected to the normally driving shaft 7 by means of any conventional clutch such as is commonly found on automotive vehicles, although it is possible to operate a vehicle according to the present disclosure without any clutch between the source of power and the transmission.

Let it be further assumed for the purpose of this description that the source of vehicle power connected to the normally driving member 7 will normally rotate the same clock-wise as viewed from the left end of Figure 1. The device to be operated and driven, such as an automotive vehicle is assumed to be connected to the driven shaft 8, and the field winding 31 de-energized.

In this event, the planet gears 13—a, 14—a, 15—a and 16—a will revolve about the shafts 13—c, 14—c, 15—c and 16—c as the said gears are rotated about the still shaft 8 due to the meshing action with the still sun teeth 12 of the said shaft. Inspection will show that the clock-wise rotation of the driving member 7 will cause the gears 13—a, 14—a, 15—a and 16—a to rotate clock-wise, or in the same direction as the rotation of the normal driving 7, except as hereinafter described.

There are more teeth on the annular gears 13—b, 14—b, 15—b and 16—b than there are sun teeth 12 on the normally driven member 8. Consequently, as the teeth 12 are still, it is evident that the annular gear 13—b will be rotated about the shaft 8 at a faster speed than the gears 13—a are rotated about the shaft 8 by the shaft 7. This increase of speed of the annular gear 13—b over the speed of the normally driving member 7 will be hereinafter described as the advancing rate between adjacent differential speed sets. The actual advancing rate will, of course, be determined by the actual design of the said individual differential sets. It is evident there is a wide range of possible advancing rate, and that the said rate may be different for each set.

Figure 2:
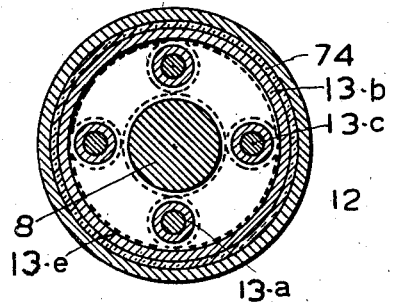
Figure 2 is a transverse sectional elevation taken approximately upon the line 2—2 of Figure 1 looking in the direction indicated by the arrows.

This differential action may be more clearly seen by reference to Figure 2 of the drawings. The planet pinion gears 13—a are shown mounted for rotation on the pinion shafts 13—c fixed in the hub extension of the engine shaft 7, and the annular gear 13—b is shown in mesh with the gears 13—a. In a similar manner the annular gears 14—b, 15—b and 16—b are in mesh with the planet gears 14—a, 15—a and 16—a and the teeth 12 of the shaft 8.

Still further consideration of the arrangement of Figure 1 will show that a very small increase in the speed advancing ratio of the annular gear 13—b by the gear 13—a will result in a comparatively great increase in the final speed of the annular gear 16—b.

Thus according to the present disclosure, it is possible to provide means whereby the inductor portion 19 forming a portion of the annular gear 16—b may be rotated clock-wise at a comparatively great speed when the normal driving shaft 7 is rotated and the normally driven shaft 8 remains at rest.

Now let it be further assumed that it is desired to move the mechanism to which the normally driven shaft 8 is connected. In this event, the operator closes the switch 48 of Figure 1, which for the purpose of this description may be considered as the conventional ignition switch as commonly found on automotive vehicles.

If the said switch closing is accomplished by hand, the variable resistance 50 and the wiper 44 attached to the conventional gas pedal is adjusted as required for the normal operation of the vehicle. In this event current will be conducted to the field flux producing winding 31 by means of the leads 23 and 24. This flux will pass through the flux path 82 formed by the portion 66 of the casing 22, end portion 36, armature portion 35 and the inductor portion 19 of the annular gear 16—b along the general path indicated by the dotted line 82 of Figure 1.

The rotational movement of the pole pieces of the armature flux path portion 19 will cause the magnetic flux created by the current flowing in the field winding 31 to cut the inductor portions of the armature windings 20 in a manner well known in the electrical art. This flux cutting action will induce alternating currents in the armature windings 20 in the manner of inductor alternators as is well understood and accepted in the electrical art.

This production of alternating current in the armature winding 20 is accompanied by a drag or holding action on the said inductor portion 19 of the annular gear 16—b and thereby on the clock-wise revolving annular gear 16—b. The relatively high speed of the portion 19 relative to the stationary armature winding 20 causes a relatively high rate of flux cutting.

Although the magnetic field may be provided in any known manner that will produce the necessary flux, the present disclosure employs a ring shaped winding 31 so that the pole pieces of the armature portion 19 are all of the same polarity. It will be noted that the inductor portion 19 is provided with pole projections so as to make the flux-path air-gaps as small as possible.

This novel inductor alternator type of dynamo-electric construction permits the use of a stationary field winding and also a stationary armature winding, thus eliminating any necessity of slip-rings or commutating elements to conduct the currents to and from the same to an external circuit. No extra bearings are required for the dynamo-electric elements of the device, and there are no moving portions outside of the inductor portion 19 which normally will be provided integral with the annular gear 16—b.

The accompanying braking effect encountered in inducing current in the armature windings 20 will act to tend to slow down the clock-wise rotation of the portion 19 and thus the clock-wise rotation of the annular gear 16—b. A clock-wise driving force will now be imparted to the teeth 12 of the normally driven shaft 8 by each of the planet gears 13—a, 14—a, 15—a and 16—a in order to maintain the differential relation of the gears shown in Figure 1 as the inductor portion 19 is slowed down by the said braking action. If the gas control pedal 52 is moved so as to move the wiper 44 across the resistance 50 as the power supply to the driving member is increased, it is obvious that the strength of the field current supplied to the winding 31 may be increased as a co-incidental function of the said vehicle power supply increase. In this event, the drag on the inductor portion 19 will be increased as the power supply to the vehicle is increased.

Eventually the reaction of the gears 13—a, 14—a, 15—a and 16—a will be equal to the resistance of the normally driven member 8 and thus the member 8 will be rotated. If the speed of the normally driving member 7 is maintained at a constant speed (assumed for the purpose of this description) the vehicle will normally be accelerated as the speed of the member 8 increases and its torque resistance decreases. As the speed of the driven member 8 approaches the speed of the driving member 7, the speed of the gears 13—a, 14—a, 15—a and 16—a will also approach the speed of the member 7.

When the driven member 8 rotates at the same speed as the driving member 7 all the parts of the power transmitting mechanism rotate together with no relative motion between them. This is an ideal condition in any transmission mechanism, and particularly when found in a vehicle transmission. This condition of no relative movement between the parts is equivalent to a single integral mass at direct drive, and means the elimination of wear during a very large percentage of its operation, and a very high possible efficiency because of the total elimination of friction between the parts. In conventional transmissions there is always present the rotating parts of the countershaft.

Thus during direct drive relations of the driving member 7, and the driven member 8, it is obvious that the inductor portion 19 of the annular gear 16—b has been varied in its clock-wise rotation until it is rotating at the same speed as the members 7 and 8.

With the power shaft 7 driving the shaft 8 at the same speed through the plurality of power paths hereinbefore described, the actual relation of these paths will now be considered.

The apportionment of this power delivery through these paths may be determined theoretically by mathematical investigation for a given design. For the purpose of this description let it be assumed that roughly equal torque is imparted by the planet gear 13—a to the annular gear 13—b and the sun teeth 12 of the member 8. Thus, a large percentage of the power received from the driving member 7 is directly transmitted to the sun teeth 12 and the shaft 8 by the gear 13—a. The remainder of the power is transmitted to the shaft 14—c and thus to the pinion gear 14—a and thence divided between the annular gear 14—b and the teeth 12 of the member 8. In the same manner power is divided by all the gears, and the final power division path is found in the inductor portion 19. For example, it is possible to so design the device of Figure 1 that only approximately 6 per cent of the total power transmitted from the member 7 to the member 8 will be needed in the form of current induced in the armature winding 20 to act to cause the control of all the power transmitted. If another secondary differential set had been added to the showings of Figure 1, only about 3 percent of control power in the form of current in the winding 20 is needed. If two sets are added only 1½ percent will be needed. This is, of course, an approximation, but as hereinbefore stated, the actual percentage can be determined.

It is, of course, possible to add many more secondary differential sets, theoretically each additional set will reduce the holding action applied to the inductor portion 19 to thereby control the transmission of all the power transmitted at varying speed from the member 7 to the member 8.

If the vehicle is being operated along a level path, the torque of the driven member 8 will normally decrease as its speed increases, and the clock-wise speed of the inductor member 19 will also decrease until all the gears of the device of Figure 1 have no relative movement and a condition of direct drive has been effected as hereinbefore described. Now if the magnetic field strength produced by the winding 31 is sufficient, holding current will be generated in the armature winding 20 so as to further reduce the clock-wise speed of the portion 19 to a speed below the speed of the driven member 8. In order to maintain the differential driving relations of the gears of Figure 1, it is evident that the speed of the normally driven member 8 will now be greater than the speed of the member 7 and a condition of overspeed drive relation will be effected in the transmission mechanism.

With continued retardation of the inductor portion 19, its speed will approach zero value and the flux cutting action will decrease. Thus, the possible degree of overspeed is automatically limited because a condition will be reached wherein the flux cutting action will not increase the holding effect on the portion 19. Thus, a holding balance will be reached.

Let it be assumed at this time that the vehicle has reached a down grade portion of its path of movement. The member 7 will normally continue to be rotated by the engine, but the speed of the vehicle will now increase and thus the speed of the normally driven member 8 will increase relative to the speed of member 7 to cause the inductor portion 19 to approach zero speed. As the inductor portion 19 passes through zero speed the normally driven member 8 now becomes the driving member, and the portion 19 and the gear 16—b will be rotated relatively counter clock-wise. When the portion 19 reaches zero speed there is no magnetic flux cutting with a stationary field and thus no current holding action, because no current is generated in the armature winding 20. Thus, a condition of freewheeling exists between the power members 7 and 8 as the speed of the portion 19 approximates zero.

As the speed of the normally driven member 8 continues to increase beyond the speed of the normally driving member 7, the speed of the portion 19 will be further increased counter clock-wise, and the flux cutting action will thus increase. Under these conditions the operator will normally let up on the gas pedal 52, and thus decrease the field current supplied to the field winding 31. The present disclosure however includes the manually actuated wiper 28 in operative relation with the variable resistance 28. The wiper may be set by the handle 17 to a normal operative position, and the switch 29 is assumed as closed when the ignition switch is closed. Thus, a field current is always supplied to the field winding independently of the current supplied by the fuel supply control elements 48, 50 and 44 operatively associated with the gas supply pedal 52.

Thus as the vehicle accelerates down grade a holding effect will be impressed on the portion 19 due to the current induced in the armature winding 20 and the engine will be driven against compression at a slower speed than the vehicle. If the operator applies the brake control pedal 47 to actuate the wiper 45, it is obvious that the resistance 51 will be varied to vary the supply of current to the winding 31 when the switch 46 is closed. In this event the holding action will be increased as a co-incidental function of the normal operation of the vehicle and the driving of the engine against compression will be increased with the application of the vehicle brakes. No change or adjustment of the transmission parts is required. All the switches 29, 46 and 48 may be closed with the ignition switch, or the wipers 27, 44 and 45 may be so adjusted so as to be free of the associated resistances 28, 50 and 51 except when manually actuated to come in contact with same. Under these conditions the switches 29, 46 and 48 may remain normally closed.

Inspection will show, however, that the speed of the member 7 can never exceed the speed of the member 8 for the gear arrangement of Figure 1 as long as the member 8 is the driving member. If it is desired to employ compression driving under conditions wherein the member 7 is driven at the speed of the member 8, then the unidirectional roller clutch member 72 may be employed. This more or less conventional element 72 is arranged to connect the annular gear 16—b and the shaft 8 whenever the gear 16—b rotates slower than the member 8. Thus, the member 8 will always drive the member 7 at the speed of the member 8.

No reverse speed elements are shown in the drawings. It is assumed that no invention would be involved in providing a conventional reversing device positioned in the line of power transmission between the engine and the vehicle. Because of the small percentage of the time a reverse drive is required, it is not essential as to where the control for same is placed, but it is suggested that the reverse control be placed at some convenient position on the vehicle dash.

In operating the drive control means provided by this disclosure, it is therefore possible to start with the vehicle at rest and the driving shaft 7 rotating, and thence accelerate the driven shaft 8 to the speed of the driving shaft 7. The proper speed relations of the driving and driven shafts will normally and automatically be obtained without action or attention on the part of the operator of the vehicle.

In addition overspeed relation of the driving and driven members 7 and 8 will occur automatically with acceleration of the vehicle or decreases of driving torque. When the normally driven member 8 becomes the driving member, or tends to become the driving member a condition of free-wheeling will automatically result over a certain speed of driving relations, and then a reverse flow of power from the normally driven shaft 8 to the normally driving member 7 will take place. This automatic action may be varied by the operator as a coincidental function of the operation of other vehicle controlling elements in the normal operation of the vehicle, or the automatic action may be varied by the operator without regard to the operation of the said other vehicle controlling elements. Thus, the operator may obtain drive conditions to meet the conditions he may encounter in a given locality or for varying weather conditions.

It should be noted that the armature current generated in the device disclosed in my co-pending application, Serial Number 23,040, is locally short-circuited within the confines of the armature winding (as 20) whereas the current generated in the armature winding of the present device is conducted to an external circuit.

Referring to Figure 1 it will be seen that the leads 32 and 33 are connected to the armature winding 20 and to a closed circuit including the variable resistance 58, wiper 59, variable impedance 61 and leads 53 and 56. Thus, the magnitude of the current flowing from the armature winding may be varied by the wiper action when the switch 60 is closed. Thus, there is provided a still further method of controlling the speed relations of the members 7 and 8 since any variation in the holding action of the induced armature currents will act to vary the retardation of the inductor portion 19. Furthermore, the heat liberated by the resistance will be outside of the transmission casing 22 and thus act to hold the temperature of the transmission as a unit to a lower value.

When the switch 60 is open the same current that flows through the resistance 58 will also flow through the variable impedance 61 normally varied by the movable core 62 for a given frequency or current condition. While the core 62 may be manually set for given circuit and frequency conditions to vary the impedance and thereby the current, it should be noted that after the said core has been positioned, the frequency of the alternating current inducted in the armature winding 20 will vary with the speed of the inductor element 19.

As is well known in the electrical art, impedance circuit elements may be designated to vary in their circuit effect with the frequency of the current and the present disclosures employs this well known action to aid in the further automatic control of the speed drive relations between the members 7 and 8. Normally the voltage of the current induced in the armature winding 20 will vary as the speed of the inductor element 19, and thus the magnitude of the resulting current conducted to the external circuit including the resistance will normally vary as the speed of the inductor element 19. But the armature current frequency will also increase as the speed of the inductor portion 19. Thus, with the variable resistance of element 58 alone in the external armature circuit, there would be no way to limit the induced current which may approach an undesirable magnitude with the vehicle engine racing and the shaft 8 at rest. Furthermore, without the current limiting action of element 61, the speed ratios of the members 7 and 8 may become so great as to permit excessive and undesirable speed ratios between the members 7 and 8. Thus, as the speed of the inductor portion 19 increases the impedance element 61 will automatically act to limit the current flowing in the external armature circuit. At low inductor speed and thus at low frequencies the limiting effect of the impedance element 61 will be little or nothing, and thus the current will not decrease as fast as the speed of the portion 19 and the armature current can be of large value at low speeds. There is also shown a rectifying element 57 preferably of the oxide type connected to the lead 32 by means of the lead 54. Lead 55 and the lead 42 conduct the rectified current to the battery 40 and thus the induced armature current is stored for use in operating other vehicle elements and to also aid in supplying current to the field producing winding 31. Thus, a portion of the control current is additionally employed thereby still further increasing the efficiency of the present device.

Figure 6:
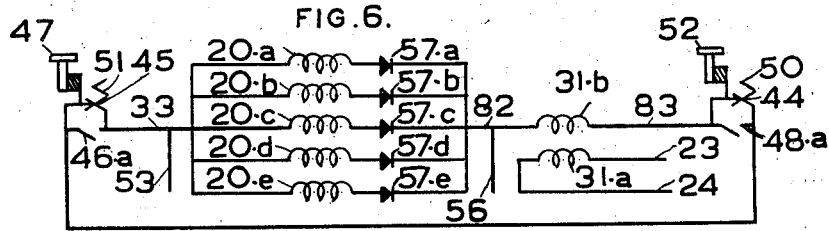
Figure 6 is a diagrammatic presentation of one method of connecting the armature inductors to a plurality of rectifying elements.
Figure 4:
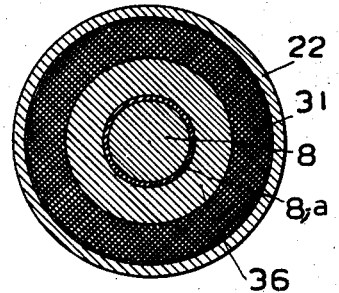
Figure 4 is a transverse sectional elevation view taken approximately upon the line 4—4 of Figure 1 looking in the direction indicated by the arrows.

In Figure 6 there is shown more or less diagrammatically a method of rectifying all the armature induced current, so that the dynamo-electric means including the stationary armature windings 20, stationary field winding 31 and the plurality of rectifiers 57—a, 57—b, 57—c, 57—d and 57—e may be placed in circuit in series and without any moving circuit elements. The field winding 31 of Figure 1 would be split up into two windings 31—a and 31—b. Winding 31—a would normally be energized by a comparatively weak current normally supplied by the battery 40 of Figure 1, and winding 31—b would be energized by rectified current induced in the windings 20—a, 20—b, 20—c, 20—d and 20—e. In this event it is suggested that the number of armature windings 20 be more or less than the number of inductor portions 19, and not the same number as shown in Figure 3. With this arrangement the rectified current will approach a more constant value and thus produce a more constant field. The field winding 31—b is connected to all the 57—a to 57—e rectifiers by the lead 82. It is contemplated that the supply of current to the initiating field winding 31—a will be turned on with the actuation of the conventional ignition switch as commonly found on self-propelled combustion type vehicles, and thence will flow through the said initiating winding at a more or less uniform intensity. Thus, according to the modification as shown by Figure 6, the current supply to the accumulative field winding 31—b will be manually and co-incidentally controlled by the brake and fuel supply control elements 47 and 52 of Figure 1 as shown in Figure 6. It is obvious that the current supply of both field windings 31—a and 31—b of Figure 6 could be simultaneously controlled by the brake and fuel supply elements of Figure 1 by the proper actuation of the switches 46—a and 48—a or by simply arranging both circuit breakers as 44—50 and 45—51 of both figures to be operated by the same manual movement. In fact all of the controls shown in Figures 1 and 6 may be interchanged according to the conditions under which the device will be installed and operated.

The currents induced in the armature windings 20—a to 20—e will be in phase relation according to the number of coils 20 and the number of poles of the inductor 19. Thus, the rectified current flowing in the winding 31—b will approach a continuous current and may be additionally evened out by the proper use of the impedance element 61 of Figure 1 as is well known in the electrical art.

While I have shown and described and have pointed out in the annexed claims certain novel features of my invention, it will be understood that certain well known mechanical equivalents of the elements illustrated may be used, and that various other substitutions, omissions and changes in the form and details of the device illustrated and in its operation may be made by those skilled in the electrical and mechanical art without departing from the spirit of the invention which is indicated in the following claims.

For example, the annular gears 13—b, 14—b and 15—b may be supported on bearings positioned on the shaft 8 as shown in application Number 23,040.

Having thus described my invention, I claim:

1. The combination in a vehicle power transmission including a pair of shafts, differential speed driving sets each in speed driving relation with one of the shafts and with each neighboring set, one set in driving relation with the other shaft for establishing a drive between the shafts, of control means including a source of current for automatically establishing a desired speed relation between the shafts as the drive is effected, said control means comprising an alternating current, dynamo-electric brake including a fixed field portion energized from said source, a rotatable element and a fixed armature portion energized by power received from said shafts through said sets, a plurality of manually operable co-incidental vehicle fuel supply and brake means for separately controlling the field element current supply and thereby causing the brake to become effective, said control means being operable incidental to the rotation of the shafts to additionally augment the intensity of the action of the brake, and a unidirectional clutch for connecting the shafts in positive drive relation independently of the fixed field producing means.

2. A slip-drive device for connecting a vehicle driving member and a vehicle driven member in speed drive relations, including gear sets arranged to provide progressively divisible power paths, a dynamo-electric slip-drive couple including a rotatable element and stationary field and armature elements constituting the last path division and arranged for deriving control power from one of the members according to the extent of the said path division and the relative movement of the dynamo-electric elements, means operable with the vehicle fuel supply control means for initiating and varying the power deriving action of the said couple, and other means separately operable with the brake control means of the vehicle for varying the power deriving action of the said couple as the first named fuel control means remains inoperative.

3. A torque multiplying power actuated slip-clutch device for associating a driving member and a driven member of a vehicle provided with braking and power supply means, comprising co-operatively associated gear sets each connected to the driven member and to each adjacent set, one of said sets connected to the driving member and a second set provided with a restraining element energized by power derived from the driving member through the said sets, a source of electric current, variable magnetic means energized from the said source for generating alternating current for controlling the restraining action of the element, and co-incidentally actuated brake and power supply control means for separately varying the magnetic control whereby the variable speed driving relations of the members will bidirectionally become a function of the combined effect of the resistance of the driven member, the speed of the driving member, the frequency of the generated current, and the selective co-incidentally controlled intensity of the said current controlled restraint.

4. A torque amplifying device for affecting the speed driving relation of driving and driven members of a vehicle provided with braking and fuel supply means, including speed driving units axially disposed between said members, a slip-drive couple including a fixed armature, an inductor element mounted for rotation with one unit and a fixed field element, an end unit connected to one member, and all units connected to each adjacent unit and the other member, automatic current control means associated with the fixed armature element, and a plurality of field current control means operatively associated with the said vehicle brake and fuel supply means for co-incidentally varying the action of the slip-drive control means as separate co-incidental functions of the operation of the fuel supply or the braking means during the operation of the vehicle.

5. A regenerative slip-drive device for connecting a vehicle driving member and a vehicle driven member in speed drive relations, including gear sets arranged to provide progressively divisible power paths, a dynamo-electric slip-drive couple including a rotatable element and stationary field and armature elements constituting the last said power path division and arranged for deriving control power from one of the members according to the extent of the said path division and the speed of the rotatable member, a brake control means for the vehicle, means operable with the brake control means of the vehicle for varying the power deriving action of the said couple.

6. A variable speed power transmission mechanism including a driving member and a driven member provided with brake and power supply control means, and a control amplifying resistant member between said members, said resistant member including inductor alternator dynamo-electric means for initiating the said control action, and a plurality of differential gear sets for amplifying the effect of the said control power when initiated, said sets arranged in a series multiple relation so as to provide series mutiple power paths for the transmission of power between said members, each set connected to the driven member and to adjacent sets, one set connected to the driving member, circuit means co-incidentally associated with the brake and power supply control means for causing the initiating means to receive the control power to be amplified by the sets from one of the members thereby to effect the differential transmission of power from one member to the other through the said paths as a function of the operation of the said brake and power supply controls during the normal operation of the vehicle, and means for employing a portion of the control power to energize the field of the dynamo-electric means.

7. A slip-drive device for effecting variable speed driving relations between a driving member and a driven member, comprising differential speed sets each connected to the driven member and to adjacent sets, one of said sets connected to the driving member, alternating current dynamo-electric means connected to one of the sets for deriving speed effecting power current from the rotation thereof, and inductive circuit means positioned to receive the said power current from the dynamo-electric means so as to control its magnitude as a function of its frequency.

8. A control amplifying device for effecting and affecting drive relations between power members, comprising differential drive sets each in driving relation with the members, an alternating current slip-drive couple including two fixed field producing elements, a fixed armature element and a rotatable inductor element connected to one of the said sets to act to cause the armature element to derive control power from one of the members through the other sets, circuit means for conducting the derived power to an external circuit including a variable resistance element and a variable impedance element, said impedance element arranged to limit the derived current in the armature element in accordance with its frequency.

9. A device for effecting drive relations between driving and driven members, comprising speed drive sets each in driving relation with the driven member and with adjacent sets, one set in driving relation with the driven member, a slip-drive couple comprising an electric brake with two fixed field elements, a fixed armature element and a rotatable element in operative relation with another set, and circuit means for employing the current induced in the armature element to aid in creating magnetic flux in the flux path of the said field elements.

10. A torque amplifying device for affecting the speed driving relation of driving and driven members of a vehicle provided with braking and fuel supply control means, including speed drive units axially disposed between said members, a slip-drive dynamo-electric couple including a fixed armature element, a fixed field producing element and an inductor element mounted for rotation with one unit, an end unit connected to one member, and all units connected to adjacent units and the other member, automatic current control means associated in circuit relation with the said armature element, and a plurality of field current control means operatively associated with the brake and fuel supply means for co-incidentally varying the supply of current to the fixed field and thereby the action of the control means in addition to the action of the automatic current control means as separate coincidental functions of the fuel supply or the braking means during the normal operation of the vehicle.

11. In a self-energizing speed control device, the combination of a plurality of gears in differential drive relation, dynamo-electric control means for causing the gears to approach the same movement about a common axis, said means including two field producing elements, a common fixed armature element and a rotatable element mounted for rotation with certain of the gears, manually actuated circuit elements for controlling the supply of current to one of the field elements for placing the said dynamo-electric means in a relatively light clutching condition, and further manually actuated means for co-incidentally controlling the supply of current induced in the armature element to the other field element for placing the dynamo-electric means in a more intense clutching condition by virtue of the movement of the said rotatable element.

HOWARD J. MURRAY.